(12) United States Patent
Kalish

(10) Patent No.: US 7,343,736 B2
(45) Date of Patent: Mar. 18, 2008

(54) FLEXIBLE EXHAUST EMISSION AFTERTREATMENT SYSTEM FOR COMPRESSION CYCLE DIESEL ENGINES

(75) Inventor: Yury Kalish, West Bloomfield, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/362,992

(22) Filed: Feb. 27, 2006

(65) Prior Publication Data
US 2007/0199311 A1    Aug. 30, 2007

(51) Int. Cl.
*F01N 3/00* (2006.01)
(52) U.S. Cl. .................. 60/288; 60/286; 60/287; 60/292; 60/295; 60/311; 60/324
(58) Field of Classification Search .................. 60/286, 60/287, 288, 290, 292, 293, 295, 297, 301, 60/311, 324
See application file for complete search history.

(56) References Cited

U.S. PATENT DOCUMENTS

| | | |
|---|---|---|
| 4,725,411 A | 2/1988 | Cornelison |
| 5,246,205 A | 9/1993 | Gillingham et al. |
| 6,240,725 B1 | 6/2001 | Scappatura |
| 6,708,486 B2 * | 3/2004 | Hirota et al. ............ 60/297 |
| 6,779,339 B1 * | 8/2004 | Laroo et al. ............ 60/297 |
| 6,820,417 B2 * | 11/2004 | May et al. .............. 60/297 |
| 6,826,906 B2 | 12/2004 | Kakwani et al. |
| 6,832,473 B2 * | 12/2004 | Kupe et al. ............. 60/286 |
| 6,877,312 B2 * | 4/2005 | Nakatani et al. ........ 60/288 |
| 6,877,313 B1 | 4/2005 | Phillips et al. |
| 6,889,498 B1 | 5/2005 | Chandler et al. |
| 6,892,531 B2 | 5/2005 | Rim |
| 6,898,929 B2 | 5/2005 | Asmus et al. |
| 6,912,847 B2 | 7/2005 | Deeba |
| 7,021,048 B2 * | 4/2006 | Taylor et al. ........... 60/295 |
| 2005/0056004 A1 | 3/2005 | Kakwani et al. |

FOREIGN PATENT DOCUMENTS

JP    406033735 A * 2/1994 ............ 60/287

* cited by examiner

*Primary Examiner*—Binh Q. Tran
(74) *Attorney, Agent, or Firm*—Rader, Fishman & Grauer, PLLC; Bill C. Panagos

(57) ABSTRACT

An apparatus for the reduction of nitric oxides (NOx) and particulate matter of exhaust emissions from a diesel engine having an electronic control module. The apparatus includes a first treatment device for reducing particulate matter and a second treatment device for reducing NOx emissions from the engine exhaust. The apparatus also includes a first valve in fluid communication with the exhaust inlet from the engine and a second valve in fluid communication with a common exhaust outlet. The first and second valves are in fluid communication with each other through a fluid connection extending therebetween.

14 Claims, 3 Drawing Sheets

FLEXIBLE EXHAUST EMISSION AFTERTREATMENT SYSTEM FOR COMPRESSION CYCLE DIESEL ENGINES

BACKGROUND OF THE INVENTION

1. Field of the Invention

The present invention relates to a flexible exhaust emission aftertreatment system for compression cycle diesel engines.

The present invention further relates to a flexible exhaust emission aftertreatment system having synchronously operated valves to direct the flow of exhaust gas through the system responsive to the engine control module or driver input.

The present invention further relates to a flexible exhaust emission aftertreatment system having synchronously operated valves to direct the flow of exhaust gas through the system responsive to the engine control module or driver input wherein one treatment removes Particulate Matter from the exhaust gas flow and another treatment removes nitric oxides (NOx) emission from the exhaust gas flow.

The present invention further relates to a flexible exhaust emission aftertreatment system having synchronously operated valves to direct the flow of exhaust gas through the system responsive to the engine control module wherein the system is comprised of a Diesel Particulate Filer to remove Particulate Matter from the exhaust gas flow and a Selective Catalyst Reduction (SCR) system to remove NOx from the exhaust gas flow.

The present invention further relates to a flexible exhaust emission aftertreatment system to allow flexibility for exhaust gas to flow through particulate matter aftertreatment first and through NOx aftertreatment second, or through NOx aftertreatment first and through particulate matter aftertreatment second, or only through NOx aftertreatment bypassing particulate matter aftertreatment or only through particulate matter aftertreatment bypassing NOx aftertreatment.

2. Description of the Related Art

Cornelison, U.S. Pat. No. 4,725,411 discloses an exhaust treatment system in parallel to having a butterfly valve arrangement in the y-shaped exhaust connections between the treatment devices. The butterfly valve responds to pressure drops in the engine as well as to pressure changes in the exhaust system to direct the flow of the exhaust gases from one exhaust treatment device to another. Specifically, when a pressure change occurs the valve shuts the exhaust gas flow off to that particular treatment device and direct the exhaust gas flow to the other treatment device thereby allowing the affected treatment device to burn off any exhaust particulates which may have fouled the system.

Gillingham et al., U.S. Pat. No. 5,246,205 discloses a poppet valve assembly for use in an exhaust system. The poppet valve is used in an assembly to provide control of hot gas flows included through exhaust systems.

Scappatura U.S. Pat. No. 6,240,725 discloses an apparatus and method for the removal of carbon particles (soot), odor, gas and particulate from the exhaust of a diesel engine. The method includes a carbon (soot) collector which collects the carbon and noxious odor which is connected to the catalytic converter of the engine, then enters a heat exchanger for cooling and condensing a major portion of the exhaust gas into a liquid condensate. The condensate enters a reactor that neutralizes any acids present. The non-condensate gases flow to a second reactor where a second chemical reaction absorbs carbon monoxide and nitrogen oxide.

Kakwani et al., U.S. Pat. No. 6,826,906 discloses a diesel engine exhaust system that uses catalyzed soot filters for particulate matter reduction and urea Selective Catalyst reduction (SCR) catalysts and urea for NOx reduction on diesel engines in a combined system to lower particulate and NOx at the same time.

Kakwani et al., U.S. Patent Application Publication No. US2005/0056004 A1 discloses a diesel engine aftertreatment exhaust system that uses catalyzed soot filers for particulate matter reduction and urea SCR catalyst for NOx reduction on diesel engines in a combined system to lower particulate matter and NOx at the same time.

SUMMARY OF THE INVENTION

The present invention is directed to an apparatus for the reduction of nitric oxides (NOx) and particulate matter of exhaust emissions from a compression ignition diesel engine having an electronic control module (ECM). The apparatus is comprised of a first treatment device for reducing NOx emissions from the exhaust emissions. The first device is comprised of a hollow housing having a front wall, a back wall, a top wall, a bottom wall and sidewalls extending substantially unbroken therebetween to define a hollow housing. The front wall of the housing is equipped with an inlet and the back wall of the housing is equipped with an outlet. The apparatus also has a second treatment device for reducing particulate matter from the exhaust. The second device is comprised of a hollow housing having a front wall, a back wall, a top wall, a bottom wall and sidewalls extending substantially unbroken therebetween to define the hollow housing. The front wall is equipped with an inlet and the back wall equipped with an outlet. The inlet from said first treatment device and the inlet from said second treatment device are in fluid communication with each other and an engine exhaust gas flow stream from the engine. The exhaust gas flows through a first multi-position valve. The outlet from the first treatment device and the outlet from the second treatment device are also in fluid communication with each and a common exhaust outlet through a second multi-position valve. The first valve is in fluid communication with the exhaust inlet from the engine and the second valve is in fluid communication with said common exhaust outlet, and the first valve and the second valve are in fluid communication with each other through a fluid connection extending therebetween. The first and second multi position valves may be controllable and responsive to input from said engine ECM to control the flow of exhaust gas through said apparatus responsive to engine operating conditions.

DETAILED DESCRIPTION OF THE PREFERRED EMBODIMENT(S)

Figure 1:
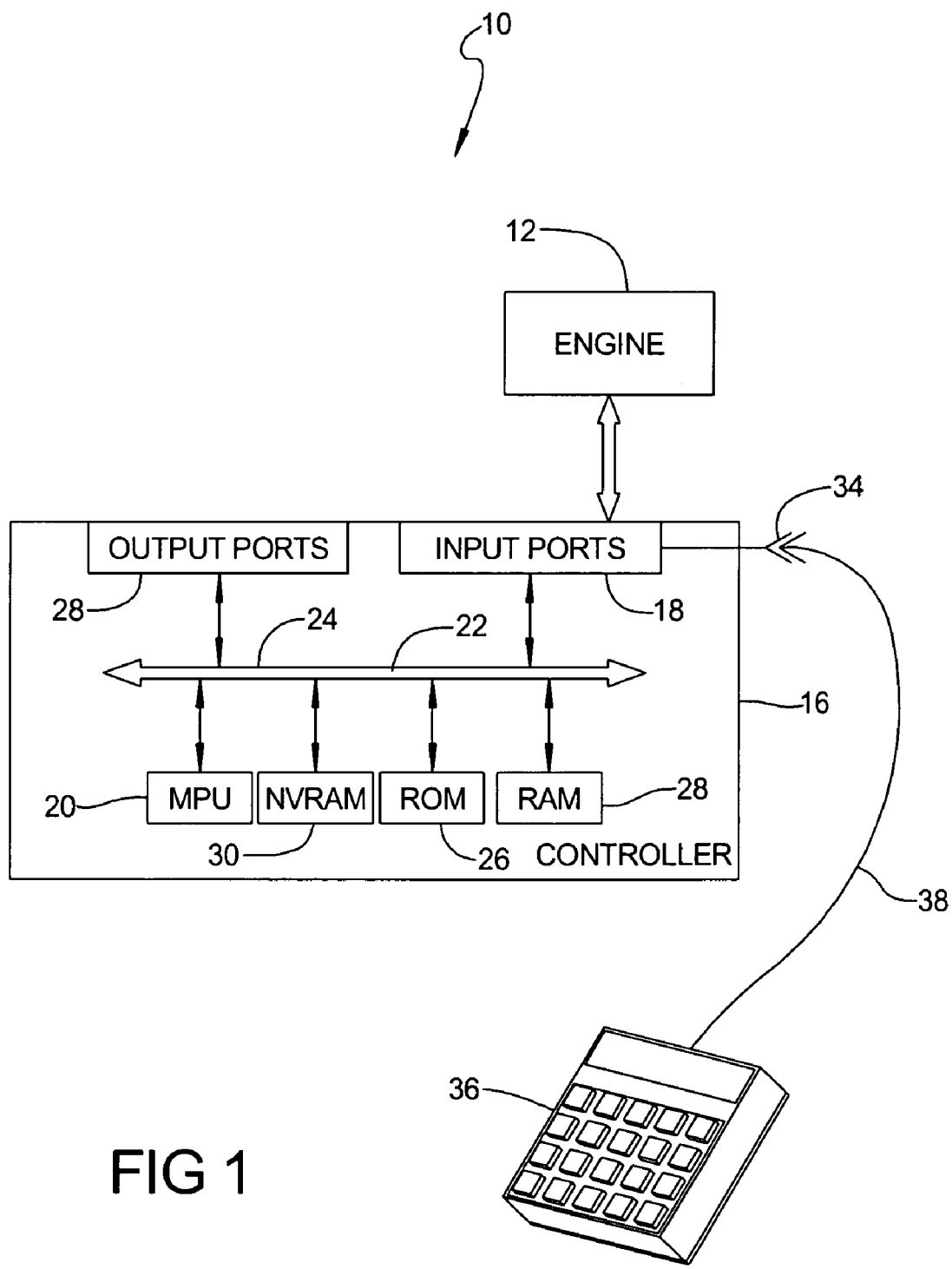
FIG. 1 is a block diagram illustrating a system for implementing the exhaust system control according to the present invention.

Referring now to the drawings when like numerals refer to like structures, and in particularly to FIG. 1, the apparatus for exhaust treatment 10 includes engine 12 having a plurality of cylinders fueled by fuel injection by fuel injectors or common rail. In the preferred embodiment, the engine 12 is a compression ignition and internal combustion engine such as a four, six, eight, twelve, sixteen or twenty-four cylinder diesel engine or a diesel engine having any other desired number of cylinders. The fuel injectors are receiving pressurized fuel from a supply connected to one or more high or low-pressure pumps (not shown) as is well known to those who are skilled in the art. Alternatively, embodiments of the present invention may employ a plurality of unit pumps (not shown) with each pump supplying fuel to one of the injectors. The system may also include an ignition and, a starter, such as is well known to those of ordinary skill in the art. A controller 16 preferably includes a microprocessor 20 in communication with various computer readable storage media 22 via data and control bus 24. Computer readable storage data may include any of a number of known devices which function as a read only memory (ROM) 26, random access memory (RAM) 28, non volatile random access memory (NVRAM) 30 and the like. The computer readable storage media may be implemented by any of a number of known physical devices capable of storing data representing instructions executable via a computer such as a controller. Known devices may include, but are not limited to PROM, EPROM, EEPROM, flash memory, and the like in addition to magnetic, optical, and combination media capable of temporary or permanent data storage.

The computer readable storage media includes various programs, instructions, software and control logic to effect control of various systems and sub-systems of the vehicle, such as the engine 12, the vehicle transmission, the ignition, the starter and the like. The controller receives signals from sensors via input ports and generates output signals which may be provided to various actuators and all components via the output ports. A diagnostics and programming interface 34 may also be selectively connected via communication 38 to the controller by a plug to exchange various information. The interface 36 may be used to change values within the computer readable storage such as configurations settings, control logic, and the desired exhaust treatment mode and valve control calibration value when present. Examples of parameters that may affect how the exhaust is treated include ambient conditions, engine operating conditions, vehicle speed, engine speed, detection of faults, or any combination thereof. Of course in accordance with the present invention, there may be more than one exhaust treatment mode and preferably there are several exhaust treatment modes that the vehicle operator may choose from depending upon ambient conditions, engine operating conditions, vehicle speed, engine speed, detection of faults, or any combination thereof. The mode of exhaust treatment may also be changed using any hand held device known in the art, so long as it is compatible with the ECM software.

In a preferred embodiment, the controller is a DDEC controller available from Detroit Diesel Corporation of Detroit, Mich. Various other features of this controller are described in detail in U.S. Pat. Nos. 5,477,827 and 5,445,128, the disclosures of which are hereby incorporated by reference. However, it is contemplated that this invention may be adapted for use with any engine controller.

It should be appreciated by those of ordinary skill in the art that the control logic may be implemented or effected in hardware, software, or a combination of hardware and software. The various functions are preferably affected by a programmed microprocessor, such as the DDEC controller that may include one or more functions implemented by dedicated electric, electronic or integrated circuits. As will also be appreciated, the control logic may be implemented using any number of many programming and processing techniques and strategies and is not limited to the order or sequence illustrated here which is merely for convenience. Parallel processing and multi-tasking systems and the methods may be used to accomplish the objects, features and advantages of the present invention. The present invention is independent of the particular programming language, operating system, or processor used to implement the control logic illustrated.

Figure 2:
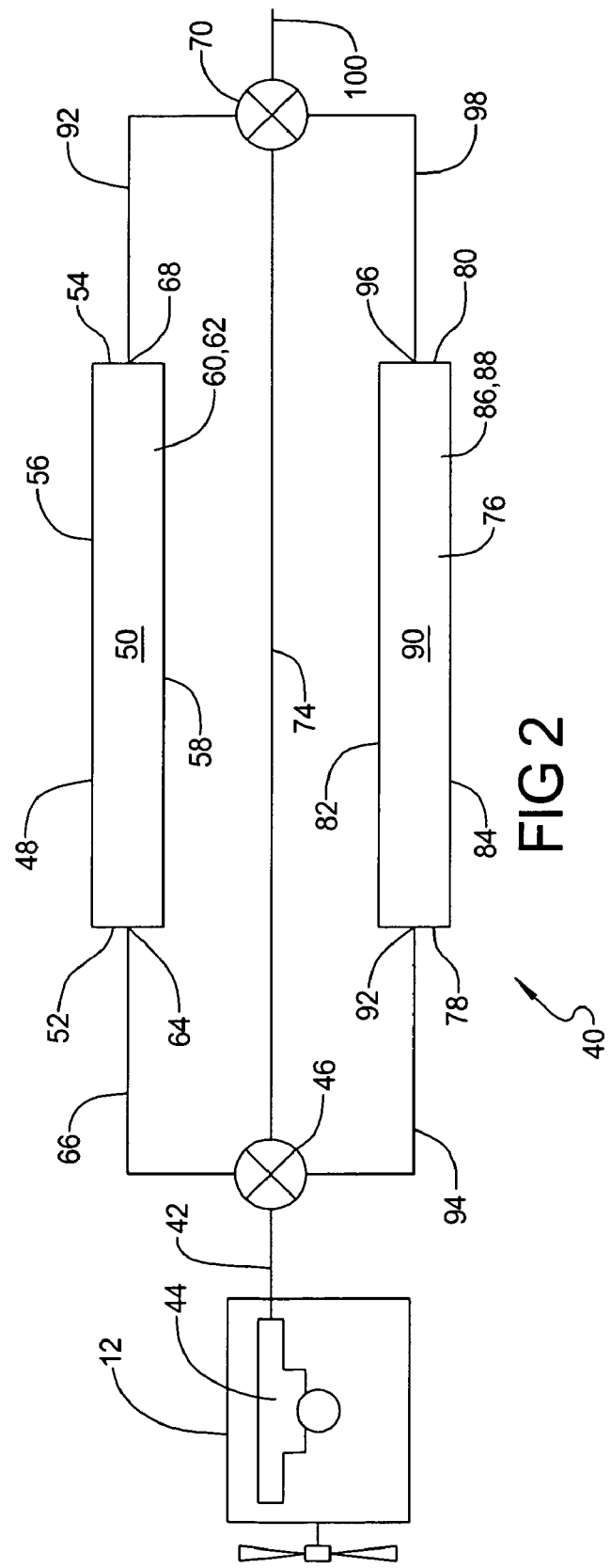
FIG. 2 is schematic illustrating one embodiment of the exhaust system of the present invention.

Turning now to FIG. 2, there is depicted a schematic representation of the apparatus for the reduction of nitric oxides (NOx) and Particulate Matter (PM) of exhaust emissions from a compression ignition diesel engine having an electronic control module.

Specifically, the apparatus 40 is in fluid communication through inlet exhaust system conduit 42 with an engine exhaust manifold 44. The inlet exhaust conduit 42 is in fluid communication with a multi positioned valve 46 that is controllable by the ECM of the engine responsive to ambient conditions, road speed, engine speed, engine operating conditions, fault detection, driver input or any other parameter deemed desirable to affect position of the valve and the treatment of the exhaust gas from the engine. As shown, valve 46 is a two position four way valve. However, any valve may be used in the direction of engine exhaust gas flow through the apparatus 40.

The first treatment device 48 for reducing particulate matter from the exhaust emission of the engine is comprised of a hollow housing 50 having a front wall 52, and back wall 54, a top 56, a bottom 58 and sidewalls 60, 62 extending substantially unbroken therebetween to define a hollow housing. Front wall 52 is equipped with an exhaust inlet 64 in fluid communication with said first valve through exhaust inlet conduit 66. Back wall 54 is equipped with an outlet 68 in fluid communication with a second multi position valve 70 through exhaust outlet conduit 92.

Valves 46 and 70 are in fluid communication through exhaust conduit 74 extending therebetween. Valve 46 is in fluid communication with a second treatment device 76 for reducing NOx emissions from the exhaust gas flow. The second treatment device is comprised of a front wall 78, a back wall 80, a top 82, a bottom 84 and sidewalls 86,88 extending substantially unbroken there between to define a hollow housing 90. Front wall 78 is equipped with an inlet 92 and is in fluid communication with said valve 46 through exhaust inlet conduit 94. One of ordinary skill in the art will understand that by means of this construction, the inlet of the first treatment device and the inlet of the second inlet device are in fluid communication with each other through valve 46 and are in fluid communication with engine exhaust conduit 42.

Back wall 80 is equipped with an outlet 96 that is in fluid communication with valve 70 though exhaust conduit 98. One of ordinary skill in the art will understand that by means of this construction, the outlet of the first treatment device and the outlet of the second treatment device are in fluid communication with each other through valve 70 and are in fluid communication with engine exhaust outlet conduit 100.

Tight emission regulations for diesel engines may require utilization of two separate aftertreatment devices. One device is for the reduction of nitric oxides (NOx) emissions and another device is for the reduction of particulate matter (PM). Under certain conditions, it is advantageous for the engine exhaust gas to flow through the NOx treatment device first, and then flow through the PM treatment device, while under other conditions it may be better for the exhaust gas to flow through the PM aftertreatment device first and then through the NOx aftertreatment device.

This is accomplished in the following manner. Specifically, valves 46 and 70 operate synchronously, and are controlled by the ECM based upon operating conditions, road conditions, fault detection, engine speed, vehicle speed, driver input or any other parameter useful for the treatment of exhaust gases. For example, when the exhaust gas reaches first valve 46, it may be diverted to either the PM treatment device or the NOx treatment device, depending upon the position of valve 46. By way of example, in a first position the valve 46 diverts the exhaust gas flow to the first treatment device and in a second position the valve 46 diverts the exhaust gas flow to a second treatment device. Once the exhaust gas flow passes through the treatment device, it encounters second valve 70. If the exhaust gas flow passed through the first treatment device, and valve 70 is in the proper position, the exhaust gas flow passes through exhaust conduit 74 to the first valve and then through the second treatment device inlet, through the second treatment device, out through exhaust conduit 78 through second valve 70 and through common exhaust conduit 100. As can be seen, exhaust gas flow direction through either side of apparatus is the same.

Figure 3:
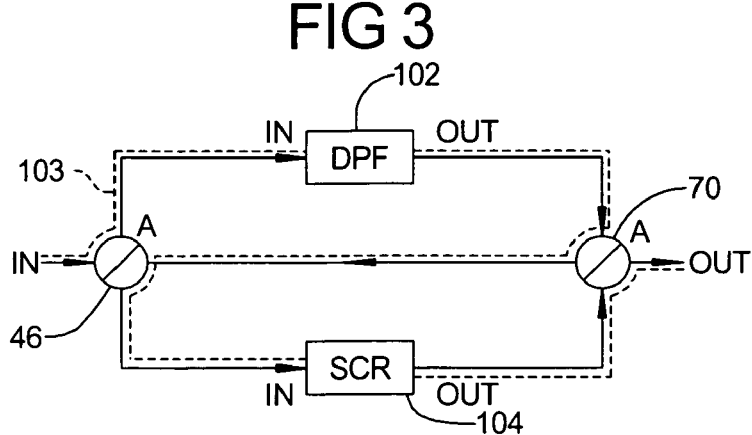
FIG. 3 is another schematic illustrating another embodiment of the exhaust system of the present invention.

FIG. 3 is another preferred embodiment of the apparatus of the present invention. Specifically, the first treatment device is a Diesel Particulate Filter (DPF) 102 for use as the PM aftertreatment device, and Selective Catalyst Reduction (SCR) system 104 is used as the NOx aftertreatment. FIG. 3 represents a state when conditions require exhaust gas 103 to flow first through a DPF and then through a SCR. In this case, both valve 46 and 70 are in the same position.

Figure 4:
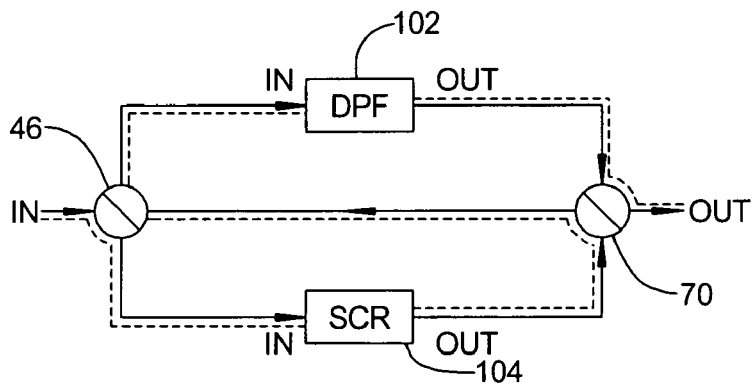
FIG. 4 is another schematic illustrating another embodiment of the present invention.

FIG. 4 represents the state when conditions require exhaust gas 103 to travel through the SCR first and then through the DPF. In this condition, both valves are in the same position, but different than the position of the valves in FIG. 3.

In reference to FIGS. 2, 3 and 4, it is also possible for the valves 46 and 70 to be actuated in such a way that exhaust gas passes only though one or another of the aftertreatment devices, but not both. For example, if valve 46 is in a first position, and valve 70 is in a second position, the gas may pass through only one of the treatment devices and not the other. If valve 46 is in a second position and valve 70 is in a first position, then the exhaust gas will flow through the other treatment device but not the same treatment device as in the example given above.

Figure 5:
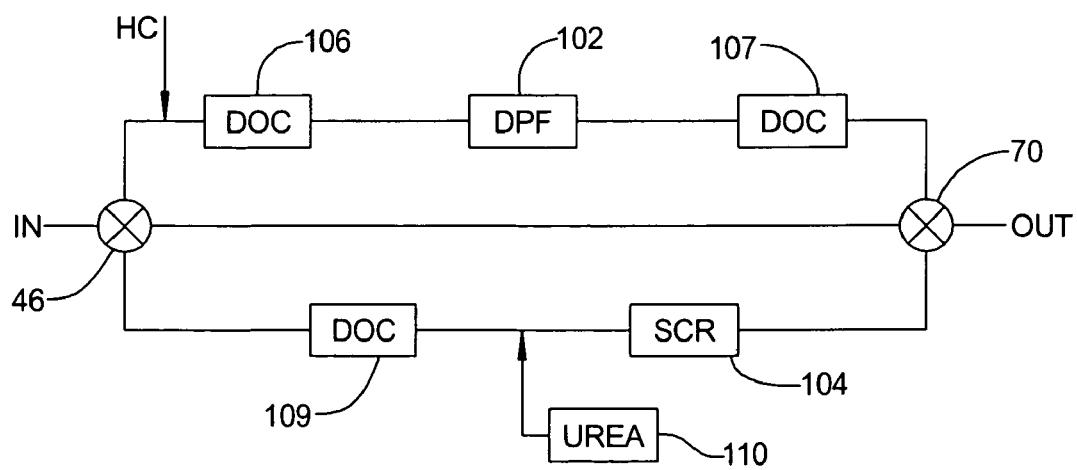
FIG. 5 is another schematic illustrating another embodiment of the present invention.

FIG. 5 is another representation of another preferred embodiment. Specifically, Diesel Oxidation Catalysts (DOC) 106 may be included in the exhaust gas flow prior to the inlet and, optionally also after the outlet on the DPF system shown as DOC 107. In addition, DOC shown as 109 may be present after the outlet of the SCR or second treatment device. Finally, it is contemplated to permit the injection of UREA 110 into the exhaust gas flow prior to the inlet of the SCR to facilitate removal of NOx from the exhaust gas.

Those having ordinary skill in the art will recognize that the schematic representations of FIGS. 2 through 5 are for illustrative purposes only. While specific embodiments are presented, various modification will become apparent to one of ordinary skill in the art without departing from the scope and spirit of the invention as set forth in the appended claims.

I claim:

1. An apparatus for the reduction of nitric oxides (NOx) and particulate matter of exhaust emissions from a compression ignition diesel engine having an electronic control module (ECM), comprising;
   a first treatment device for reducing particulate matter from said exhaust emissions; said first device comprised of a hollow housing having a front wall, a back wall, a top wall, a bottom wall and sidewalls extending substantially unbroken therebetween to define said hollow housing; said front wall equipped with an inlet and said back wall equipped with an outlet;
   a second treatment device for reducing NOx emissions from said exhaust, said second device comprised of a hollow housing, said housing having a front wall, a back wall, a top wall, a bottom wall and sidewalls extending substantially unbroken therebetween to define said hollow housing; said front wall equipped with an inlet and said back wall equipped with an outlet;
   said inlet from said first treatment device and said inlet from said second treatment device in fluid communication with each other and an engine exhaust stream from said engine through a first multi-position valve;
   said outlet from said first treatment device and said outlet from said second treatment device in fluid communication with each and a common exhaust outlet through a second multi-position valve;
   said first valve in fluid communication with said exhaust inlet from said engine and said second valve in fluid communication with said common exhaust outlet; each said first valve and said second valve in fluid communication with each other through a fluid connection extending therebetween; said first valve in a first position diverts the flow of exhaust gas to said inlet of said first treatment device; said exhaust gas exits said outlet of said first treatment device and is diverted by said second valve in a first position synchronous with said first valve position and diverts said exhaust gas flow to said inlet of second treatment device and through said second treatment device through said second treatment device outlet and said common exhaust outlet;
   said first and second multi position valves controllable and responsive to input from said engine ECM to control the flow of exhaust gas through said apparatus responsive to engine operating conditions.

2. The apparatus of claim 1, wherein said first and second valves are four way, two position valves synchronously controlled by said ECM.

3. The apparatus of claim 1, wherein said first treatment device is a diesel particulate filter and said second treatment device is a Selective Catalyst Reduction system.

4. The apparatus of claim 1, wherein said first valve in a second position diverts the flow of exhaust gas to said inlet of said second treatment device; said exhaust gas exits said outlet of said second treatment device and is diverted by said second valve in a second position synchronous with said first valve position and diverts said exhaust gas flow to said inlet of said first treatment device and through said first treatment device outlet and said common exhaust outlet.

5. The apparatus of claim 1, wherein said ECM synchronously control the position of said first and second valves responsive to ambient conditions.

6. The apparatus of claim 1, wherein said ECM synchronously controls said first and second valve position responsive to engine operating conditions.

7. The apparatus of claim 1, wherein said ECM synchronously controls said first and second valve position responsive to detection of faults.

8. The apparatus of claim 1, wherein said ECM synchronously controls said first and second valve position responsive to driver inputs.

9. The apparatus of claim 1, wherein said ECM synchronously controls said first and second valve position responsive to vehicle operating conditions.

10. The apparatus of claim 1, wherein said first valve in a first position diverts the flow of exhaust gas to said inlet of said first treatment device; said exhaust gas exits said outlet of said first treatment device and is diverted by said second valve in a second position synchronous controlled with said first valve position and prevents said exhaust gas flow to said inlet of second treatment device, said exhaust gas flows through said first device outlet and through said common exhaust outlet.

11. The apparatus of claim 1, wherein said first valve in a second position diverts the flow of exhaust gas to said inlet of said second treatment device; said exhaust gas exits said outlet of said second treatment device and is diverted by said second valve in a second position synchronous controlled with said first valve position and prevents said exhaust flow to said inlet of said first treatment device, said exhaust flows through said second device outlet and through said common exhaust outlet.

12. The apparatus of claim 1, further including diesel oxidations catalysts positioned in fluid communication with said first treatment device.

13. The apparatus of claim 1, further including diesel oxidation catalysts positioned in fluid communication with said second treatment device.

14. The apparatus of claim 1, further including urea administered to said exhaust gas proximate to said inlet of said second treatment device.

* * * * *